J. LUKENS.
Heating and Puddling Furnace.
No. 227,277. Patented May 4, 1880.
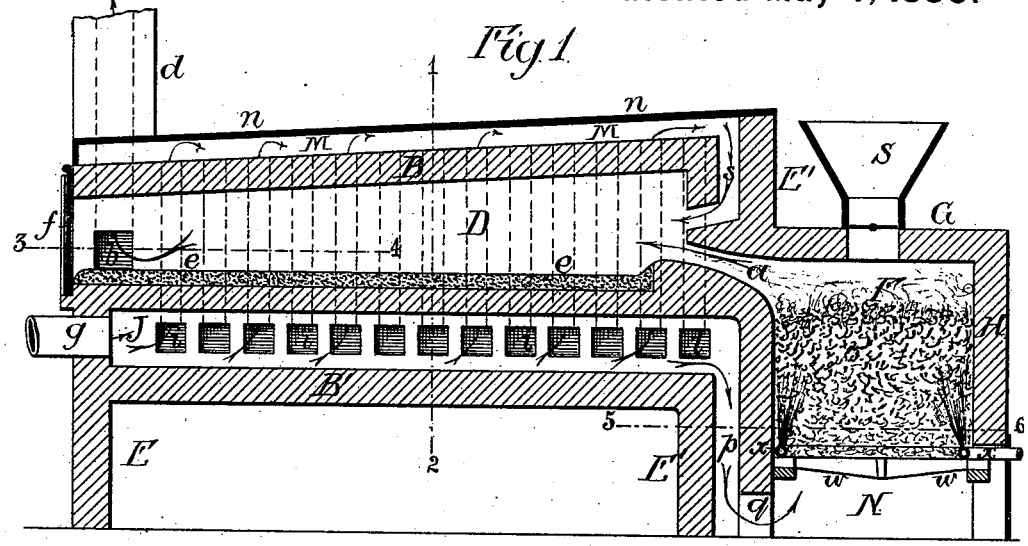
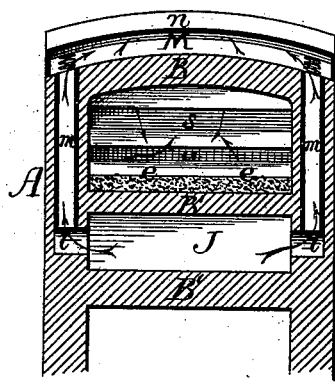
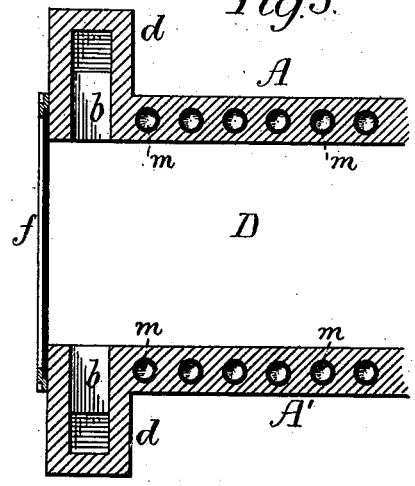
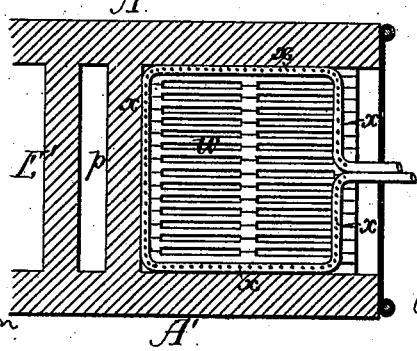
Witnesses
Alexander Patterson
Harry Smith
Inventor
Jawood Lukens
by his Attorneys
Howson and Son

UNITED STATES PATENT OFFICE.

JAWOOD LUKENS, OF CONSHOHOCKEN, PENNSYLVANIA.

HEATING AND PUDDLING FURNACE.

SPECIFICATION forming part of Letters Patent No. 227,277, dated May 4, 1880.

Application filed December 1, 1879.

*To all whom it may concern:*

Be it known that I, JAWOOD LUKENS, of Conshohocken, Montgomery county, Pennsylvania, have invented a new and useful Improvement in Heating and Puddling Furnaces, of which the following is a specification.

The main object of my invention is to so construct a heating or puddling furnace as to preserve the structure surrounding the heating or puddling chamber, to impart a high degree of heat to volumes of air, and to mix these heated volumes of air with the gases from the fuel, so as to insure the thorough combustion of said gases, further objects of the invention being to adapt the furnace for the heating of long bars or plates, and to prevent the formation of clinkers on the walls of the fuel-chamber.

My invention consists of a certain arrangement of chambers and passages in the structure surrounding the heating or puddling chamber, whereby an air-jacket around said chamber is formed, and the air thus heated is introduced into the heating or puddling chamber at a point contiguous to that at which the gases from the fuel enter the same.

The invention further consists in a mode of preventing the formation of clinkers on the walls of the fuel-chamber by injecting jets of steam upward into said chamber and in proximity to the walls of the same.

In the accompanying drawings, Figure 1 is a longitudinal section of a heating-furnace constructed according to my invention; Fig. 2, a transverse section on the line 1 2; Fig. 3, a sectional plan on the line 3 4, and Fig. 4 a sectional plan on the line 5 6.

A A' are the side walls of the furnace; B, the roof, and B' the bottom, of the heating-chamber D; E E', the end walls of said heating-chamber, and F the fire-place, of which G is the roof, and H the outer end wall, the side walls of the said fire-place being formed by extensions of the side walls, A A', of the chamber D.

The products of combustion pass from the fire-place F into the heating-chamber D through a passage, $a$, in the wall E', and after traversing said chamber D pass through lateral flues $b$ in the walls A A' into chimneys $d$, one of which is arranged on each side of the furnace.

The heating-chamber has the usual bed $e$ of cinder, and the rear end of the chamber is closed by a sliding door, $f$, on opening which access may be had to the interior of the said chamber. By thus making the opening at the rear instead of at the side, as usual, plates or bars as long as the chamber itself may be readily introduced into or withdrawn from the furnace.

The bottom B' of the heating-chamber is hollow, and contains a chamber, J, into which air under pressure is introduced from a blast-pipe, $g$. In each of the side walls, A A', in line with the chamber J, are formed a series of recesses, $i$, which communicate, through pipes $m$ built into said side walls, with a chamber, M, above the roof B of the furnace, said chamber being formed, in part, by a box or casing, $n$, of metal, fire-brick, or other suitable material. The ash-pit N receives a proper supply of air from the chamber J through a passage, $p$, and opening $q$ in the wall E', and the chamber M communicates, through a passage, $s$, in the wall E', with the front end of the heating-chamber D at a point immediately above the passage $a$, through which the products of combustion enter the said heating-chamber.

By means of the chamber J and pipes $m$ the heating-chamber D is almost entirely surrounded by an air-jacket, so that the walls, the roof, and the bottom of the furnace are maintained in a comparatively cool condition, and are thus prevented from being burned out, the air, in its passage through the chambers and pipes, becoming very highly heated, and issuing in volumes from the passage $s$, so as to mingle with the gaseous products of combustion as the latter issue from the passage $a$, the complete combustion of these gases and the production of a flame of intense heat being thus assured.

Resting on the grate $w$ near the edges of the same, and extending along all sides of the fire-place F, is a perforated pipe, $x$, to which steam is admitted, and from which said steam is discharged in the form of a number of jets in proximity to the walls of the said fire-place. By this means the combustion of the fuel is facilitated and the coking of the said fuel against the walls in the form of clinkers is prevented, owing to the force of the jets of steam and the comparative coolness of the walls adjacent thereto.

The fuel may be introduced into the fire-place F through a valved hopper, S, as shown in the drawings, or the fire-place may be fed from one side in the usual way, if desired.

Although I have shown and described my invention as applied to a heating-furnace, it may be applied to puddling-furnaces or to heating-furnaces differing in minor details of construction from that shown and described.

Passages in the side walls, A A', may be employed in place of the pipes $m$, although the latter are preferred, as they add to the stability of the wall.

In some cases it may be advisable to provide the passages $s$ and $p$ with valves or dampers, whereby the flow of air through the same may be regulated.

I am aware that an air-chamber above and a similar chamber beneath the puddling or heating chamber of a furnace have been combined with an external passage connecting the two chambers, and that passages in the side walls of the fire-place and other passages in the roof of a puddling-chamber have been combined with a distributing-chamber above the bridge-wall; and I am also aware that steam has been injected into the center of a mass of incandescent fuel for the purpose of facilitating combustion; hence I do not desire to claim, broadly, air-heating chambers or passages in the walls of a furnace; nor do I claim, broadly, the introduction of steam-jets into the mass of fuel in the fire-place; but

I claim as my invention—

1. The combination, in a furnace, of the heating or puddling chamber D, the chamber J extending beneath the same, the chamber M extending over the roof, the connecting-pipes or passages $m$ in the side walls, and pipes or passages for introducing air into the chamber J and conveying it from the chamber M into the furnace, all substantially as specified.

2. The combination of the fire-place F and the furnace, having the heating or puddling chamber D, air-heating chambers J and M, and connecting pipes or passages $m$, with the partition-wall E', having the air-passage $s$ and the gas-passage $a$ below the air-passage, said passages terminating at points adjacent to each other, all substantially as set forth.

3. The combination of the fire-place F and ash-pit N and the furnace, having the chamber D, air-heating chambers J and M, and connecting pipes or passages $m$ in the side walls, with the partition E', having passages $s$, $a$, and $p$, the passage $s$ communicating with the chambers M and D, the passage $a$ with the fire-place F and chamber D, and the passage $p$ with the ash-pit N and chamber J, all substantially as set forth.

4. The mode herein described of preventing the formation of clinkers on the walls of the fire-place, said mode consisting in projecting jets of steam upward in a substantially vertical course into the fire-place in proximity to the walls thereof, all as specified.

In testimony whereof I have signed my name to this specification in the presence of two subscribing witnesses.

JAWOOD LUKENS.

Witnesses:
 ALEXANDER PATTERSON,
 HARRY SMITH.